(12) United States Patent
Tatarka et al.

(10) Patent No.: US 7,027,697 B2
(45) Date of Patent: Apr. 11, 2006

(54) CABLE HAVING CONDUITS FOR RECEIVING OPTICAL FIBERS

(75) Inventors: Daniel Tatarka, Lexington, SC (US); Joseph F. Upton, Newberry, SC (US)

(73) Assignee: Pirelli Communications Cables and Systems USA, LLC, Lexington, SC (US)

( * ) Notice: Subject to any disclaimer, the term of this patent is extended or adjusted under 35 U.S.C. 154(b) by 207 days.

(21) Appl. No.: 10/035,677

(22) Filed: Dec. 28, 2001

(65) Prior Publication Data

US 2003/0123824 A1   Jul. 3, 2003

(51) Int. Cl.
G02B 6/44 (2006.01)
(52) U.S. Cl. .................. 385/110; 385/112; 385/113
(58) Field of Classification Search ........ 385/101–103, 385/105, 106, 109–114, 147
See application file for complete search history.

(56) References Cited

U.S. PATENT DOCUMENTS

| | | | | |
|---|---|---|---|---|
| 4,550,976 A * | 11/1985 | Cooper et al. | ............... | 385/103 |
| 5,046,815 A * | 9/1991 | Cain et al. | ................... | 385/101 |
| 5,214,733 A * | 5/1993 | Sadler | ......................... | 385/109 |
| 6,101,304 A * | 8/2000 | Quistorff et al. | ............ | 385/109 |
| 6,195,487 B1 | 2/2001 | Anderson et al. | .......... | 385/101 |
| 6,415,084 B1 * | 7/2002 | Iwasaki | ...................... | 385/101 |
| 6,424,772 B1 * | 7/2002 | Blazer et al. | ................ | 385/110 |
| 6,853,781 B1 * | 2/2005 | Chastain et al. | ............ | 385/112 |
| 6,876,800 B1 * | 4/2005 | Sutehall et al. | ............. | 385/113 |
| 2003/0035635 A1 * | 2/2003 | Chastain et al. | ............ | 385/112 |
| 2004/0037522 A1 * | 2/2004 | Sutehall et al. | ............. | 385/113 |

FOREIGN PATENT DOCUMENTS

| | | |
|---|---|---|
| EP | A-0371-660 | 6/1990 |
| EP | 0 456 909 A2 | 11/1991 |
| EP | 0 562 770 | 9/1993 |
| EP | 0 957 494 | 11/1999 |
| EP | 0 969 302 A1 | 1/2000 |
| EP | 1 004 914 A1 | 5/2000 |
| GB | 0 454 405 A2 * | 4/1991 |
| WO | WO 02/12943 | 2/2002 |
| WO | WO 02/12943 A1 * | 2/2002 |

OTHER PUBLICATIONS

D. Lawrence et al., "Large Scale Manufacturing and Testimony of Singlemode Cables," ICC 84, vol. 3, pp. 1051-1055 (May 14-17, 1984).

Standard Search Report from European Patent Office dated Aug. 16, 2002.

* cited by examiner

Primary Examiner—Edward J. Glick
Assistant Examiner—Thomas R. Artman
(74) Attorney, Agent, or Firm—Finnegan, Henderson, Farabow, Garrett, Dunner, L.L.P.

(57) ABSTRACT

An optical fiber cable allows for future expansion with blown optical fibers through conduits. The cable assembly includes a central strength member, a conduit, and a buffer tube of optical fibers, all surrounded by an outer jacket. The central strength member may be tubular. While the buffer tube of optical fibers accommodates current capacity requirements, the conduit and possibly the tubular strength member provide paths for blowing additional optical fibers into the cable to meet future capacity needs.

8 Claims, 4 Drawing Sheets

CABLE HAVING CONDUITS FOR RECEIVING OPTICAL FIBERS

BACKGROUND OF THE INVENTION

The present invention relates to an optical cable with an expandable fiber capacity. More particularly, the present invention relates to an expandable optical cable having conduits capable of receiving additional optical fibers as needs arise after the cable is installed.

Typically, optical fiber cables are installed underground and, in many situations, in ducts of an optical-cable passageway. When installed in ducts, the cables may be pulled through the ducts or blown through them. In a pulled installation, a leading end of a cable is attached to a line and pulled through the duct. In an air-blown installation, a gas is flowed into an end of the duct along with the cable and in a direction in which the cable is installed. In this manner, frictional forces produced between the flowing gas and the cable help to move the cable through the duct. The length of cable that can be blown through a duct can be increased by applying an additional pulling force or by a parachute-like device attached to the leading end of the cable. Unlike pulled cables, however, air-blown cables do not have to withstand high tensile loads, and, consequently, their structure can be less substantial. Air-blown cables do require a degree of stiffness, though, to facilitate their movement through ducts.

When installing optical fiber cables, it is often desirable to provide for future growth in demand along a particular communication route. An optical fiber cable installed today may not provide sufficient capacity to meet tomorrow's needs. Currently, future demand is typically accommodated by including additional ducts in a cable assembly along the particular route that are unused initially. The additional ducts meet future demand by providing a pathway through which an additional cable can be installed at some point in the future. This method of installing a separate duct and cable along a route, however, has a few disadvantages. For example, two different products (a duct and a cable) are required which often come from two different manufacturers. Additionally, installation time is increased as the two separate components necessitate additional handling.

A second option for addressing future demand is to install a cable with greater capacity than that required at the time of installation. In particular, a cable containing more optical fibers than is immediately necessary can be installed. But this is an expensive alternative as the capital investment for predicted future growth must be made at the time of initial installation. Deferring capital investment until the time of expansion is generally more desirable.

A third option is disclosed in U.S. Pat. No. 6,101,304. The '304 patent describes a so-called air blown fiber tube assembly that combines several ducts into one unit and surrounds it with an outer jacket. In particular, the assembly has a central innerduct surrounded by a plurality of strength elements and air blown fiber tubes. The assembly is installed underground using conventional boring or direct burial methods. After installation, a conventional cable (optical fiber, power, etc.) may be pulled through the central innerduct of the tube assembly. As well, fiber assemblies may be air blown into the air blown fiber tubes.

PCT application GB01/GB03343, having a priority date of Aug. 7, 2000, discloses an expandable optical fiber cable having a tubular central strength member. In this PCT application, the cable has optical fibers in buffer tubes that are stranded around the central strength member. Additional optical fibers may be blown into the tubular central strength member. PCT application GB01/GB03343 and the present application were, at the time the present invention was made, owned by the same entity or subject to an obligation of assignment to the same entity.

Applicants have found that the proposals in the known art do not provide sufficient capacity for expansion while minimizing installation costs. For example, the tube assembly of the '304 patent requires that installation take place in two steps before any operation can occur. First, the tube assembly must be installed underground, then the cables must be installed by pulling and blowing into the assembly conduits. Applicants have also noted that this tube assembly is impractical for upgrading a communication route that already has ducts installed underground.

SUMMARY OF THE INVENTION

Applicants have found that an optical fiber cable having within it the capability of expanding capacity provides a desirable alternative to prior arrangements. In particular, Applicants have discovered that a cable populated with optical fibers can help meet current capacity demands and provide for future growth along a given route by including at least one conduit outside the central strength member for receiving additional blown fibers.

In one aspect, a cable consistent with the present invention includes a central strength member, a buffer tube, a first conduit, and an outer jacket. The buffer tube is stranded around the central strength member and loosely houses at least one optical fiber. A first conduit is configured to receive at least one first blown optical fiber and is positioned external to the central strength member. The central strength member may include a bore configured to receive at least one central blown optical fiber. The outer jacket is positioned at the periphery of the cable.

Preferably, the cable also includes an inner jacket positioned inside the outer jacket. The inner jacket may surround at least the central strength member and the buffer tube. The first conduit may be positioned inside or outside the inner jacket. As well, the first conduit and the inner jacket may have substantially identical inner diameters. The cable may include a second conduit configured to receive at least one second blown optical fiber and positioned outside the inner jacket.

In another aspect, a cable consistent with the present invention includes a central strength member and a conductor of electrical energy stranded around the central strength member. The central strength member may be either hollow or solid. A first conduit is configured to receive at least one first blown optical fiber and is positioned external to the central strength member. Finally, an outer jacket is positioned at the periphery of the cable.

It is to be understood that both the foregoing general description and the following detailed description are exemplary and explanatory only and are intended to provide further explanation of the invention as claimed. The following description, as well as the practice of the invention, set forth and suggest additional advantages and purposes of the invention.

BRIEF DESCRIPTION OF THE DRAWINGS

The accompanying drawings, which are incorporated in and constitute part of this specification, illustrate several embodiments of the invention and together with the description, serve to explain the principles of the invention.

DETAILED DESCRIPTION OF THE PREFERRED EMBODIMENTS

Figure 1:
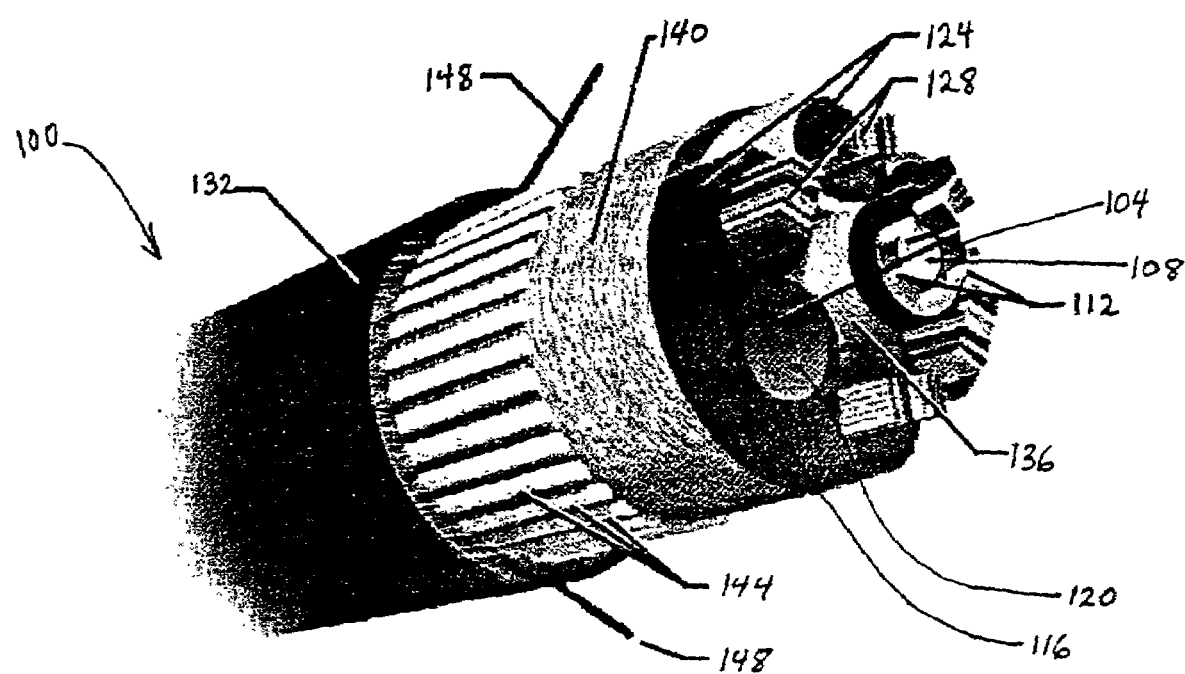
FIG. 1 is a perspective view of a cable assembly with a central strength member, multiple cables, and multiple ducts consistent with the principles of the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Consistent with the general principles of the present invention, a cable allowing for future expansion includes a central strength member, a buffer tube stranded around the central strength member, a first conduit configured to receive at least one optical fiber, and an outer jacket.

As herein embodied and illustrated in FIG. 1, a cable 100 includes strength member 104, first conduit 116, buffer tube 124, and outer jacket 132. In this embodiment, strength member 104 forms the center of cable 100. Buffer tube 124 and first conduit 116 are stranded around strength member 104. As shown, multiple buffer tubes 124 (and conduits 116) may be disposed around strength member 104. The buffer tubes loosely house at least one optical fiber 128, which with other fibers may arranged, for example, individually, in bundles, or in ribbons. While first conduit 116 and buffer tube 124 are depicted as being the same size in FIG. 1, they may be of different shapes or sizes. Preferably, however, the size of first conduit 116 is substantially similar to that of buffer tube 124 to ease manufacture and to make the diameter of cable 100 uniform. Buffer tubes 124, preferably, are formed from a polyester material, and most preferably from a polybutylene terapthalate (PBT) resin or polypropylene, and alternatively from medium density or high density polyethylene.

An outer jacket 132 forms the outer barrier of cable 100 at its periphery, surrounding the plurality of outer strength members 144. Outer jacket 132 is preferably made of a medium density polyethylene but can be made of any suitable material. For example, outer jacket 132 may be made of a reinforced plastic. In a flame retardant application, outer jacket 132 can, for example, be made of a PVC material or a low smoke halogen material. Outer ripcord 148 may be provided under outer jacket 132 or integral to outer jacket 132 to assist in opening cable 100 to access internal elements.

As shown in FIG. 1, additional protective elements may be included in cable 100. For example, a first layer of water blocking material 136 may be applied between strength member 104 and the stranded arrangement of first conduit 116 and buffer tube 124. Material 136 may be a water blocking tape or water swellable material. In another aspect, water swellable yarn may be used instead of tape. Additionally, water swellable material can be placed inside buffer tube 124 surrounding optical fibers 128. A second layer of water blocking material 140 of the same or similar material as 136 may surround the stranded arrangement of first conduit 116 and buffer tube 124.

Outer strength members 144 are optionally provided to reinforce and stiffen cable assembly 100. A layer of outer strength members 144, disposed beneath outer jacket 132, may comprise aramid or fiberglass yarns, though any convenient reinforcement may be employed.

Central strength member 104 in FIG. 1 may be solid (not shown), but preferably is hollow. If hollow, it contains a longitudinal bore 108 of any desirable shape. In this manner, an interior surface of strength member 104 defines a continuous bore 108 through which optical fibers can be passed, preferably by blowing air. Strength member 104 can be made of any suitable material. For example, strength member 104 may be formed from fiber-reinforced plastic. Preferably, strength member 104 is made of polyethylene. The polyethylene may be embedded with dielectric strength rods or, for example, e-glass. The reinforcement may also be accomplished by adding fiberglass rods, fiberglass yarn, or other suitable fillers to the plastic base material that provide the necessary anti-buckling and strength characteristics for a particular installation. In a flame retardant application, strength member 104 can, for example, be made of a PVC material or a low smoke halogen material.

First conduit 116 contains a cavity 120 for receiving optical fibers. In this manner, an interior surface of first conduit 116 forms a passageway 120 for optical fibers. First conduit 116 is preferably suited for accepting optical fibers through a blown optical fiber installation process. As mentioned, cable 100 may contain a plurality of conduits 116 just as it may contain a plurality of buffer tubes 124. First conduit 116 can be made from a fiber reinforced plastic but may be manufactured from any suitable material including the same material chosen for buffer tubes 124. First conduit 116 is preferably made from a water-resistant material, such as polyethylene. In a flame retardant application, first conduit 116 can, for example, be made of a PVC material or a low smoke halogen material.

In accordance with the present invention, optical fibers 128 within buffer tubes 124 provide an initial communication capacity for cable 100. Optical fibers 128 are installed in buffer tubes 124 upon manufacture following standard assembly techniques. Typically, bore 108 and/or first conduit 116 are empty after the manufacture of cable 100. These cavities enable cable 100 to have an expandable capacity for optical fibers. If cable 100 is installed in a communication route that later requires more fiber paths, additional fibers can be blown into bore 108 and/or first conduit 116 to accommodate that requirement. Fibers can be blown into bore 108 and/or first conduit 116 in any manner known in the art, including with the assistance of a pulling force or a pushing force like a parachute-type device.

One skilled in the art will understand that the diameter of cable 100 may be constrained by the application in which cable 100 is used. For example, if cable 100 is to be installed in an existing duct with a certain diameter, then the components comprising cable 100 need to be sized accordingly. In this manner, the diameter of strength member 104 and the number of buffer tubes 124 and conduits 116 that can be arranged within outer jacket 132 may be adjusted. Alternatively, if the installation does not have specific diameter constraints, first bore 108 of strength member 104 may be of a large diameter so as to accommodate a greater number of optical fibers. In a further configuration not illustrated but readily apparent to one of skill in the art from the present disclosure, a plurality of conduits 116 and buffer tubes 124 may be positioned around strength member 104 in multiple layers.

It will be recognized that the capacity of first conduit 116 to receive an optical fiber is dependent upon the lay length of the conduit and its inner diameter. In general, the distance a fiber can be blown is defined by the frictional characteristics of the conduit and of the cable itself, the volume of air blown through the conduit, the relative diameters of the cable and conduit, and the amount of bending required in the installation. In general, the smaller the inner diameter of first conduit 116, the more difficult it would be to blow an optical fiber through it.

The following describes further detail about one example of the embodiment of FIG. 1 consistent with the present invention. In this case, strength member 104 is polyethylene and has an outer diameter of 6.2 mm and an inner diameter of 4.0 mm. First bore 108, formed by an interior surface of strength member 104, has a diameter of 4.0 mm. In this configuration, first bore 108 can accommodate an optical fiber unit with 12 fibers (not shown) after the cable has been installed. To bolster the strength of member 104, eighteen glass reinforcement rods 112 are disposed longitudinally along and preferably within polyethylene member 104. Each of these reinforcement members 112 has a diameter of 0.7 mm. A first water swellable tape layer 136 surrounds strength member 104.

Stranded tubes surround central strength member 104. In particular, five buffer tubes 124, each with a diameter of 6.2 mm, are S-Z stranded around strength member 104. A conduit 116 with an inner diameter of 4.0 mm and an outer diameter of 6.2 mm is stranded with the buffer tubes 124 around strength member 104. The buffer tubes 124 and the conduit 116 are made of materials with similar stiffness characteristics. Conduit 116 can accommodate an optical fiber unit with 12 fibers (not shown) after the cable has been installed. The lay length of the stranded conduit would preferably range from about 40 mm to about 1100 mm.

Outside the stranded tubes, additional water blocking and strength materials protect the optical fibers of the cable. Water swellable yarns are contra-helically wound around buffer tubes 124 and conduit 116 to form second water blocking layer 140. A layer of aramid strength yarns, forming outer strength members 144, are longitudinally disposed over second water blocking layer 140. Outer MDPE jacket 132 surrounds the preceding structures to provide a cable assembly 100 with an overall diameter of 21.35 mm. This is but one example of an embodiment of the present invention and is not intended to limit the scope of the claims.

In a variation to the embodiment illustrated in FIG. 1, cable 100 may comprise a conductor of electrical energy in place of one or more of buffer tubes 124. In particular, one or more metallic conductors (not shown), typically copper or aluminum, may be positioned where buffer tubes 124 are shown in FIG. 1. In this way, cable 100 may accommodate both optical communications and electric power as a hybrid cable.

In this hybrid alternative to FIG. 1, central strength member 104 may be hollow as shown in FIG. 1, or it may be a solid rod. The choice of whether to use a hollow or a solid strength member depends on factors such as the need for additional capacity reserve for future expansion and the need for cable stiffness.

Figure 2:
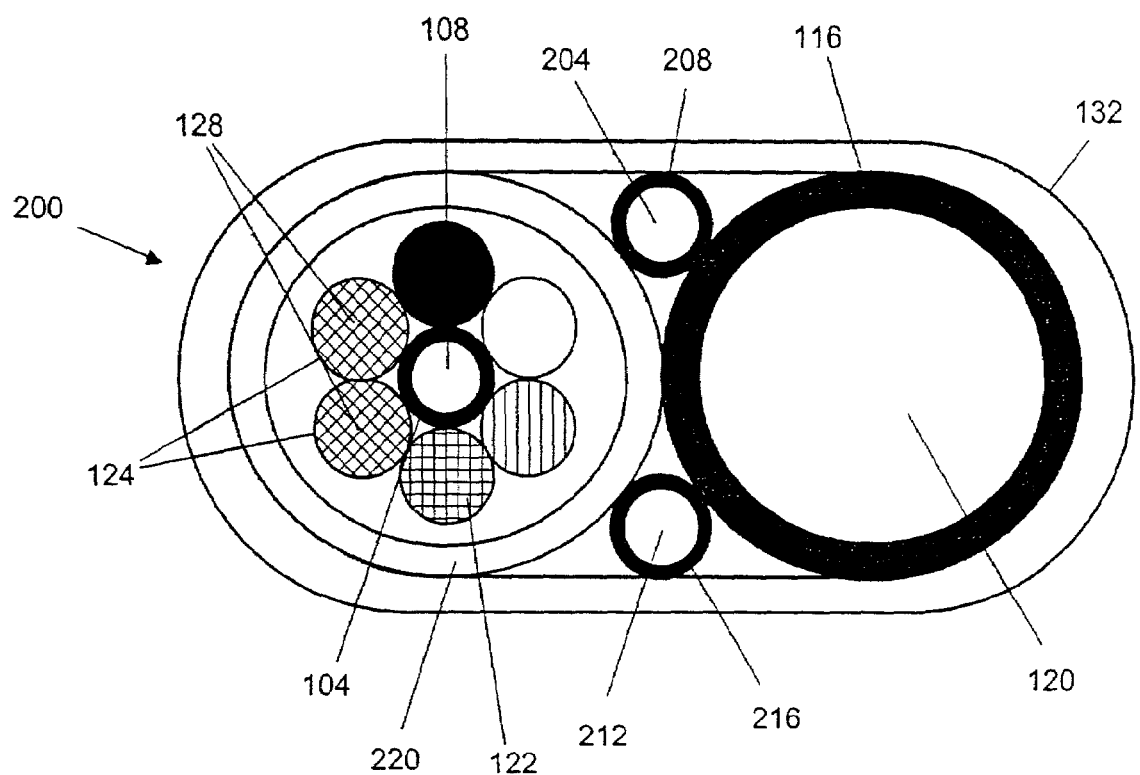
FIG. 2 is a cross-sectional view of a further embodiment of a cable assembly with multiple ducts and cables and an additional inner jacket consistent with the principles of the present invention.

FIG. 2 is a cross-sectional view of a further embodiment consistent with the present invention. As herein embodied and illustrated in FIG. 2, a cable assembly 200 includes strength member 104, first conduit 116, buffer tubes 124, an inner jacket 220, second and third conduits 208 and 216, and an outer jacket 132. Several other basic elements of the cable in this embodiment are shown in FIG. 1 but, for convenience, are not repeated in FIG. 2.

In the embodiment of FIG. 2, strength member 104 and buffer tubes 124 are arranged in the same configuration as in FIG. 1. Cable 200, however, further comprises an inner jacket 220 surrounding at least central strength member 104 and buffer tubes 124. First conduit 116 is positioned external to the central strength member 104 and outside inner jacket 220. In this embodiment, as depicted in FIG. 2, first conduit 116 has substantially the same diameter as inner jacket 220, although it may be of any size. First conduit 116 has a cavity 120 for accepting blown or pulled optical fibers.

A second conduit 208 and a third conduit 216 may be disposed in the spaces bounded by the exterior of inner jacket 220, the exterior of first conduit 116, and the interior of outer jacket 132. As in cable 100 in FIG. 1, outer jacket 132 is positioned at the periphery of cable 200. In this configuration, second conduit 208 and third conduit 216 may be sized to fit in the space formed above and below the point at which inner jacket 220 and first conduit 116 come in contact with each other, as shown in FIG. 2. Second conduit 208 and third conduit 216 may have a second cavity 204 and a third cavity 212, respectively. These second and third cavities 204 and 212 are each capable of receiving a blown optical fiber after the cable is installed. It may also be envisioned that, in addition to or alternative to conduits 116, 208, and 216, conduits for receiving blown fibers may be installed alongside buffer tubes 124, such as in the arrangement of FIG. 1.

The following describes further detail about one example of an embodiment of FIG. 2 consistent with the present invention. In this case, strength member 104 is polyethylene and has an outer diameter of 6.2 mm and an inner diameter of 4.0 mm. First bore 108, formed by an interior surface of strength member 104, has a diameter of 4.0 mm. In this configuration, first bore 108 can accommodate an optical fiber unit with 12 fibers (not shown) after cable installation.

Outside the stranded tubes, water blocking and strength materials (shown in FIG. 1 but not FIG. 2) protect the optical fibers of the cable. Eighteen glass reinforcement rods 112 are disposed longitudinally along polyethylene strength member 104. Each of these reinforcement members 112 has a diameter of 0.7 mm. A first water swellable tape layer 136 surrounds strength member 104. Six buffer tubes 124, each with a diameter of 6.2 mm, are S-Z stranded around strength member 104. An inner jacket 220 with a diameter of approximately 21.35 mm surrounds buffer tubes 124.

First conduit 116 is positioned parallel and contiguous to inner jacket 220. First conduit 116 is formed of polyethylene, has an outer diameter 21.35 mm, and an inner diameter of 12.7 mm. With this interior diameter, first conduit 116 is capable of receiving approximately 144 optical fibers even after the cable has been installed.

Outer MDPE jacket 132 surrounds first conduit 116 and inner jacket 220 to form a cable assembly 200 with overall dimensions of 24 mm by 45 mm. Optionally, second and third conduits 208 and 216, preferably made of polyethylene, are located in the spaces bounded by the interior of outer jacket 132, the exterior of first conduit 116, and the exterior of inner jacket 220. The second and third conduits 208 and 216 can have outer diameters of about 3 mm to about 15 mm with inner diameters of about 2 mm to about 10 mm. The second and third conduits 208 and 216 can receive one to approximately 60 optical fibers depending on their interior diameters. This example is but one embodiment of the present invention and is not intended to limit the scope of the claims.

The arrangement of components mentioned in conjunction with the embodiment of FIG. 1 is also applicable to the embodiment of FIG. 2. For example, any number of conduits and cables can be arranged in any convenient configuration within outer jacket 132. Additionally, the water blocking layers or outer strength members employed in the embodiment of FIG. 1 can also be used in the present embodiment. Likewise, the discussion of the preferred materials for the components of FIG. 1 is equally applicable to the cable assembly 200 of FIG. 2.

Figure 3:
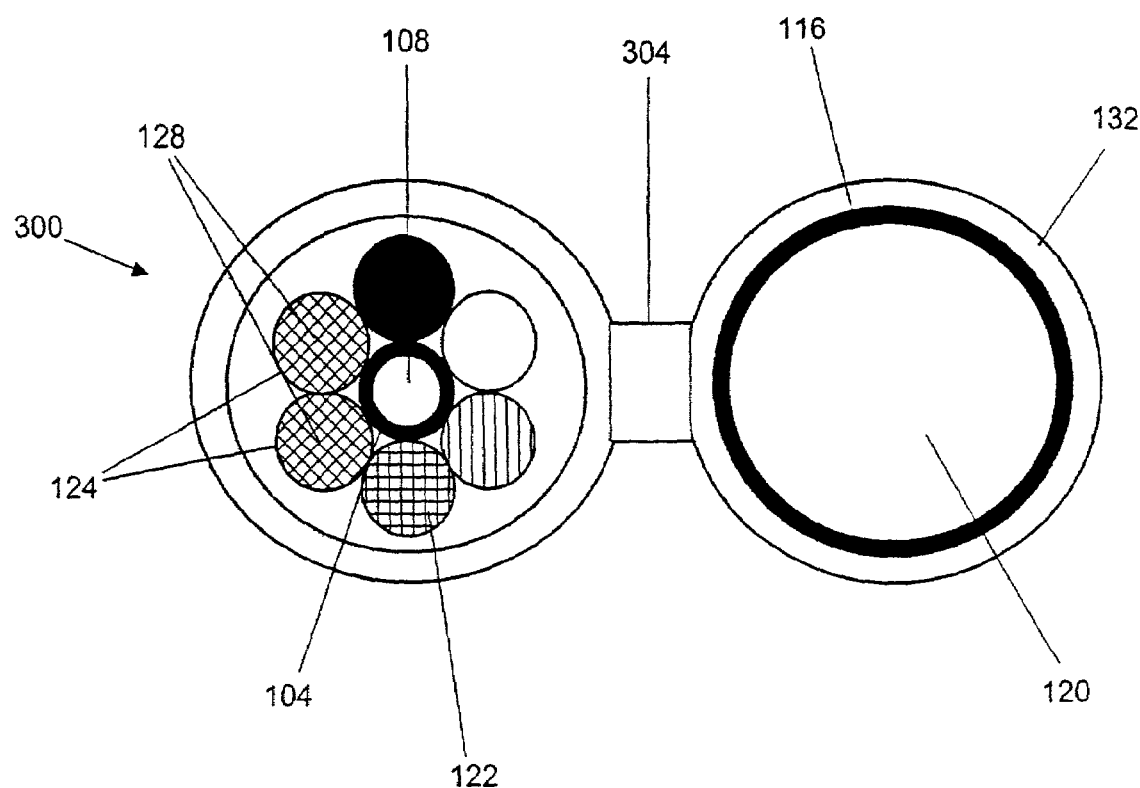
FIG. 3 is a cross-sectional view of a further embodiment of a cable assembly with multiple ducts, multiple cables, and a single outer jacket consistent with the principles of the present invention.

FIG. 3 depicts a cross-sectional view of a further embodiment of a cable consistent with the principles of the present invention. In the embodiment of FIG. 3, strength member 104 and buffer tubes 124 are arranged in the same configuration as in FIGS. 1 and 2. Any one or all of buffer tubes 124 may be empty so as to form a conduit for future blown installation of optical fibers. In this embodiment, however, a first conduit 116 is disposed parallel to strength member 104. First conduit 116 has a cavity 120 for accepting optical fibers. Outer jacket 132 forms two parallel tubes joined at connection point 304. The first of these parallel tubes houses buffer tubes 124 and strength member 104. The second of these parallel tubes surrounds first conduit 116. In this embodiment, outer jacket 132 could be formed from two separate cable jackets connected together with a thin web of jacketing material at connection point 304. Alternatively, both tubes of outer jacket 132 may be formed together with connection point 304.

The arrangement of components mentioned in conjunction with the embodiment of FIG. 1 is also applicable to the embodiment of FIG. 3. For example, any number of conduits and cables can be arranged in any convenient configuration within outer jacket 132. Additionally, the water blocking layers or outer strength members employed in the embodiment of FIG. 1 can also be used in the present embodiment. Likewise, the discussion of the preferred materials for the components of FIG. 1 is equally applicable to the cable assembly 300 of FIG. 3.

Figure 4:
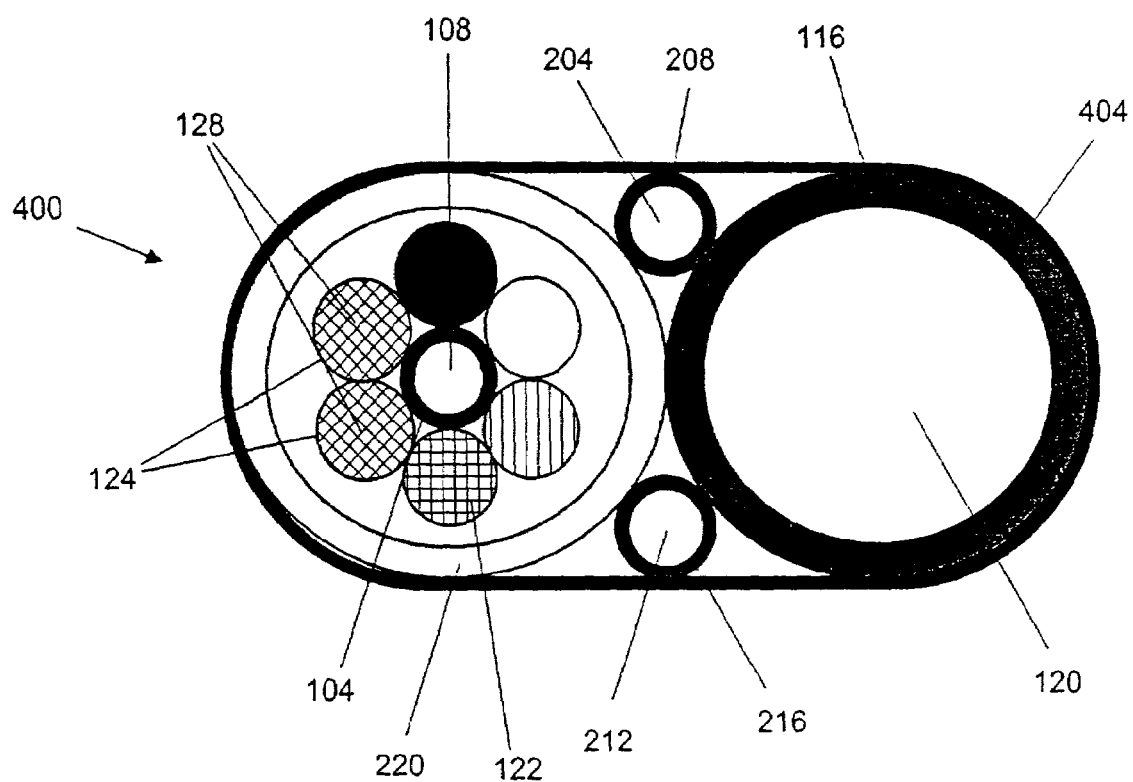
FIG. 4 is a cross-sectional view of a further embodiment of a cable assembly with multiple ducts, multiple cables, an additional inner jacket and a lashing element consistent with the principles of the present invention.

FIG. 4 is a cross-sectional view of a further embodiment of a cable assembly with multiple ducts, multiple cables, and a single outer lashing element consistent with the principles of the present invention. As herein embodied and illustrated in FIG. 4, a cable 400 includes a strength member 104, a first conduit 116, a buffer tube 124, an inner jacket 220, second and third conduits 208, 216, and an outer lashing element 404.

In the embodiment of FIG. 2, strength member 104 and buffer tubes 124 are arranged in the same configuration as in FIG. 1. In this embodiment, however, cable 400 further comprises an inner jacket 220 surrounding at least central strength member 104 and buffer tubes 124. A first conduit 116 is disposed adjacent to inner jacket 220. In this embodiment, first conduit 116 has substantially the same diameter as inner jacket 220, but it may be of any size. First conduit 116 has a cavity 120 for accepting optical fibers, either by pulling or blowing. A second conduit 208 and a third conduit 216 may be disposed in the spaces bounded by the exterior of inner jacket 220, the exterior of first conduit 116, and the interior of lashing element 404, as in cable 200 of FIG. 2. In this configuration, second conduit 208 and third conduit 216 may be sized to fit in the space formed above and below the point at which inner jacket 220 and first conduit 116 come in contact with each other. Second conduit 208 and third conduit 216 may have a second cavity 204 and a third cavity 212, respectively. These second and third cavities 204 and 212 are each capable of receiving an optical fiber.

An outer lashing element 404 surrounds all of the preceding elements of cable 400. Lashing element 404, like outer jacket 132 in FIG. 2, serves to contain first conduit 116, inner jacket 220, second conduit 208, and third conduit 216. Lashing element 404, for example, could be a 1500 Denier polyester binder, a 1125 Denier polypropylene binder, or a 0.001 inch clear polyester tape.

The arrangement of components mentioned in conjunction with the embodiment of FIG. 1 is also applicable to the embodiment of FIG. 4. For example, any number of conduits and cables can be arranged in any convenient configuration within lashing element 404. Additionally, the water blocking layers and outer strength members employed in the embodiment of FIG. 1 can also be used in the present embodiment. Likewise, the discussion of the preferred materials for the components of FIG. 1 is equally applicable to the cable 400 of FIG. 4.

Other components and structures may be employed with the cable assembly of this invention without departing from the spirit and scope of the invention. Such components and structures may include various water blocking layers, jackets, reinforcements, conduits, cables, and other elements as known by those skilled in the art. In addition, the strength member may be interchangeable with the conduit or cable. For example, the conduit or cable may provide the proper strength characteristics for the cable assembly.

It should be understood that the foregoing relates only to the exemplary embodiments of the present invention. For example, variations in the configuration of the conduits and buffer tubes are not restricted by the particular examples illustrated and described herein. Numerous changes may be made thereto without departing from the scope of the invention as defined by the following claims.

What is claimed is:

1. A cable, comprising:
   a central strength member;
   a buffer tube stranded around the central strength member, the buffer tube loosely housing at least one optical fiber placed in the buffer tube precedent to an installation of the cable;
   a first conduit configured to receive at least one first blown optical fiber subsequent to the installation of the cable and positioned external to the central strength member;
   an outer jacket positioned at the periphery of the cable; and
   an inner jacket positioned inside the outer jacket and surrounding at least the central strength member and the buffer tube, wherein the first conduit is positioned outside the inner jacket.

2. The cable of claim 1, wherein the first conduit and the inner jacket have substantially identical inner diameters.

3. The cable of claim 1, further comprising a second conduit configured to receive at least one second blown optical fiber and positioned outside the inner jacket.

4. A cable, comprising:
   a central strength member;
   a buffer tube stranded around the central strength member, the buffer tube loosely housing at least one optical fiber placed in the buffer tube precedent to an installation of the cable;
   a first conduit configured to receive at least one first blown optical fiber subsequent to the installation of the cable and positioned external to the central strength member;

an outer jacket positioned at the periphery of the cable;

an inner jacket positioned inside the outer jacket and surrounding at least the central strength member and the buffer tube and wherein the first conduit is positioned inside the inner jacket; and a second conduit configured to receive at least one second blown optical fiber and positioned outside the inner jacket.

5. A cable, comprising:

a central strength member;

a buffer tube stranded around the central strength member, the buffer tube loosely housing at least one optical fiber placed in the buffer tube precedent to an installation of the cable;

a first conduit configured to receive at least one first blown optical fiber subsequent to the installation of the cable and positioned external to the central strength member;

an outer jacket positioned at the periphery of the cable;

a first water blocking layer surrounding the central strength member; and an outer strength member located substantially parallel to the central strength member and inside the outer jacket.

6. The cable of claim 5, further comprising a second water blocking layer located between the outer strength member and the central strength member.

7. A cable, comprising:

a central strength member, wherein the central strength member includes a bore configured to receive at least one central blown optical fiber;

a conductor of electrical energy stranded around the central strength member;

a first conduit configured to receive at least one first blown optical fiber subsequent to an installation of the cable and positioned external to the central strength member;

an outer jacket positioned at the periphery of the cable; and wherein the first conduit is positioned outside an inner jacket.

8. The cable of claim 7, further comprising a second conduit configured to receive at least one second blown optical fiber and positioned outside the inner jacket.

* * * * *